(12) United States Patent
Niedrig

(10) Patent No.: US 6,237,724 B1
(45) Date of Patent: May 29, 2001

(54) BLOCKING DEVICE

(75) Inventor: Franklin F. Niedrig, Zürich (CH)

(73) Assignee: Edco-Sapim S.A., Couvet (CH)

( * ) Notice: Subject to any disclaimer, the term of this patent is extended or adjusted under 35 U.S.C. 154(b) by 0 days.

(21) Appl. No.: 09/319,992

(22) PCT Filed: Oct. 20, 1998

(86) PCT No.: PCT/CH98/00444

§ 371 Date: Jun. 15, 1999

§ 102(e) Date: Jun. 15, 1999

(87) PCT Pub. No.: WO99/20218

PCT Pub. Date: Apr. 29, 1999

(30) Foreign Application Priority Data

Oct. 20, 1997 (CH) .................................................. 2431/97

(51) Int. Cl.[7] .................................................. B60T 1/00
(52) U.S. Cl. ................................ 188/2 F; 188/17; 188/31
(58) Field of Search .............................. 188/2 F, 17, 19, 188/20, 30, 31, 69, 82.1, 82.9, 24.11, 24.22; 280/250.1, 304.1

(56) References Cited

U.S. PATENT DOCUMENTS

| | | | |
|---|---|---|---|
| 1,863,349 | * 6/1932 | Noelting et al. | 188/69 |
| 4,280,595 | * 7/1981 | Timms et al. | 188/31 |
| 4,679,862 | * 7/1987 | Luo | 301/112 |
| 5,379,866 | * 1/1995 | Pearce et al. | 188/2 F |

FOREIGN PATENT DOCUMENTS

| | | | |
|---|---|---|---|
| 47650/85 | * | 9/1984 | (AU) . |
| 42 01 745 | * | 1/1993 | (DE) . |
| 2 588 513 | * | 10/1985 | (FR) . |
| 2 725 128 | * | 9/1994 | (FR) . |

* cited by examiner

Primary Examiner—Christopher P. Schwartz
Assistant Examiner—Thomas J. Williams
(74) Attorney, Agent, or Firm—Clifford W. Browning; Woodard, Emhardt, Naughton, Moriarty & McNett

(57) ABSTRACT

The invention concerns a device with a mobile part comprising two crowns (1 and 13) rigidly coupled with rods passing through the hub (7) outside the bearings (6). The springs (20) press that frame against the fixed ring (10) such that the pins (21) are engaged in the holes (22). The lever (15) is provided with cam-branches (18) supported by the ring (23). When the lever (15) pivots about the spindles (19) the wheel is blocked or released.

9 Claims, 3 Drawing Sheets

BLOCKING DEVICE

Figure 1:
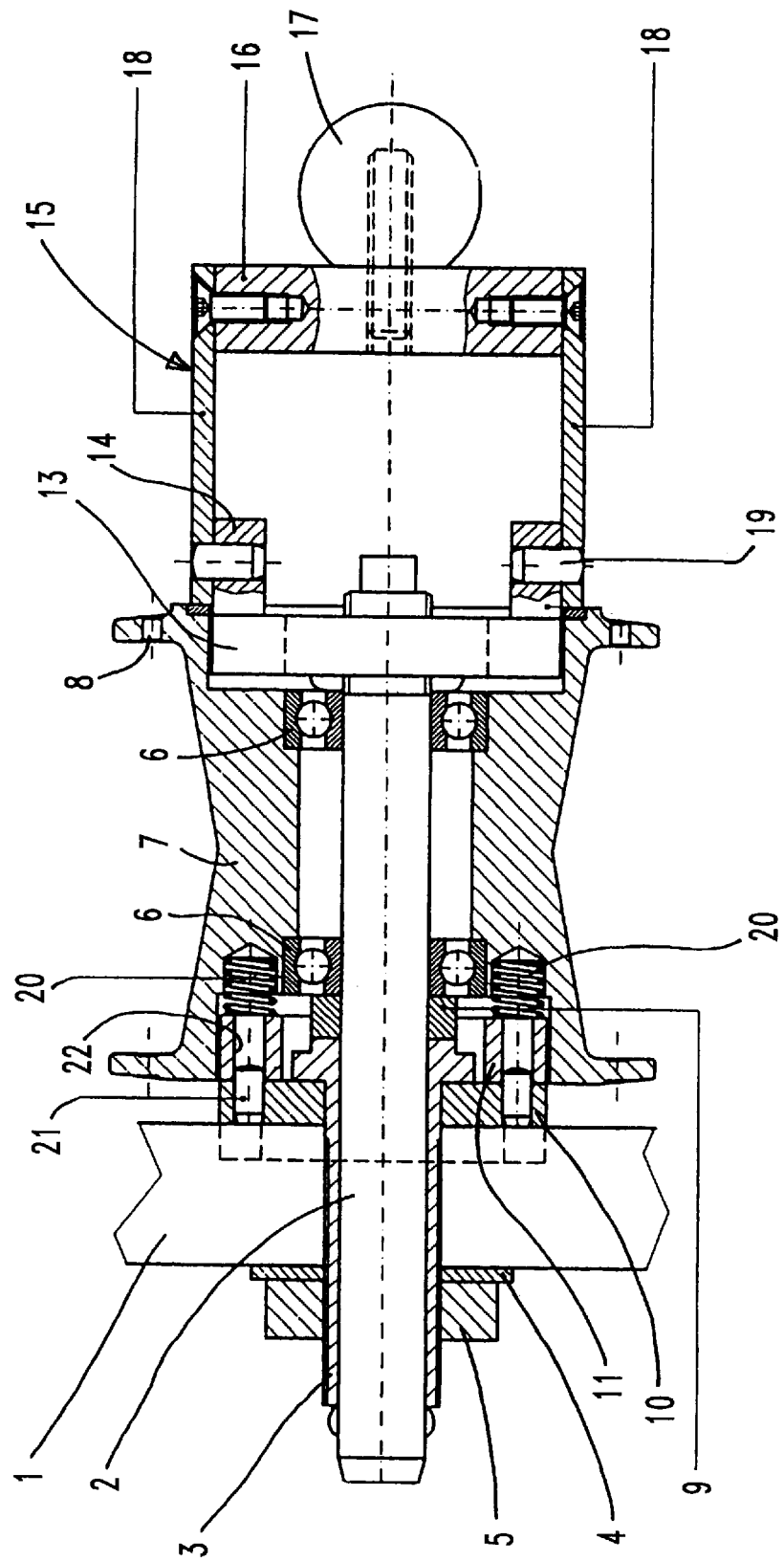

This invention concerns a blocking device for a vehicle wheel, in particular that on a wheelchair.

It is known that wheelchair type vehicles often comprise two main wheels arranged on the outside of the frame, with the hub easily accessible to the hand of the wheelchair user. In certain cases, a ring fixed to the wheel around the hub, on the outer side, enables the chair to be moved without using a drive mechanism or motor. However, it is also desirable to be able to stop the vehicle safely and, to this effect, a blocking device has already been proposed (U.S. Pat. No. 5,379,866) which is controlled by a lever fitted to the outside end of the hub. This known device comprises a mechanism with a moving part and a fixed part which engage in each other in the blocked position, controlled by the lever. However, with this known device, the two parts of the mechanism are housed in the hub. This arrangement may seem relatively compact, but the result is that it is not possible to equip the wheelchair with the hub journal easily demountable for removal of the wheel. This blocking device has not been used as it is not very practical. To date, the preference has been for a lever device which acts on the tire. However, this device does not ensure safe blocking as firstly it depends on the tire pressure and secondly it may slip on the tire.

The purpose of this invention is thus to propose a blocking device that can be fitted to a vehicle with wheels fitted to demountable journals, without obstructing dismantling, the device being of compact size and ensuring secure operation.

To this effect, this invention concerns a wheel blocking device in relation to a vehicle frame element, in particular of a wheelchair, comprising a journal linked to the frame, a wheel hub pivoting on the journal by means of bearings, a pivoting lever, mounted at the end of the hub opposite the frame, and a blocking mechanism which comprises a fixed part that is integral with the frame element and a moving part which engages in the fixed part in the blocking position, controlled by the lever, this device being characterised in that the fixed part has blocking components directly integral with the frame element, arranged around the shaft of the journal, and in that this moving part comprises blocking elements corresponding with the fixed components and joined to the lever by means of links that extend along the shaft outside the bearings.

The blocking elements of the moving part can be situated in a recess in the hub on the frame side, said moving part, on which one or more springs may act, holding it in a stable position at least in the blocking position, also possibly comprising two link rods that cross the hub axially at a distance from the shaft greater than the external diameter of the bearings and a means of supporting and pivoting the lever, at the outer ends of the rods; these springs may act permanently in the direction of the fixed blocking components and the means of supporting and pivoting the lever may comprise two diametrically opposite pivoting spindles, for two arms of the lever, these arms having cams which bear on the circumference of the hub in such a way as to control the axial displacement of the moving part in response to the pivoting of the lever.

Springs may also be combined with the lever, the geometry of the link between the cams and the moving part of the mechanism being designed such that the lever pivots 180 degrees between the blocked position and the released position, these two positions being stabilised by the force of the springs or the elasticity due to the shape of the lever.

According to one embodiment, the fixed blocking components are formed by one or more pins, this pin or these pins working with holes or notches in the moving part.

According to another embodiment, the fixed blocking components are formed by one or more holes or notches made in a ring fixed to an upright of the frame coaxially to the journal, this (or these) hole(s) or notches(s) working with one end of one or more link rods forming part of the moving part of the mechanism.

The link between the lever and the moving part of the mechanism may be arranged such that the lever has two static positions orientated 90 degrees or 180 degrees in relation to each other, one being the blocking position and the other the release position.

Figure 2:
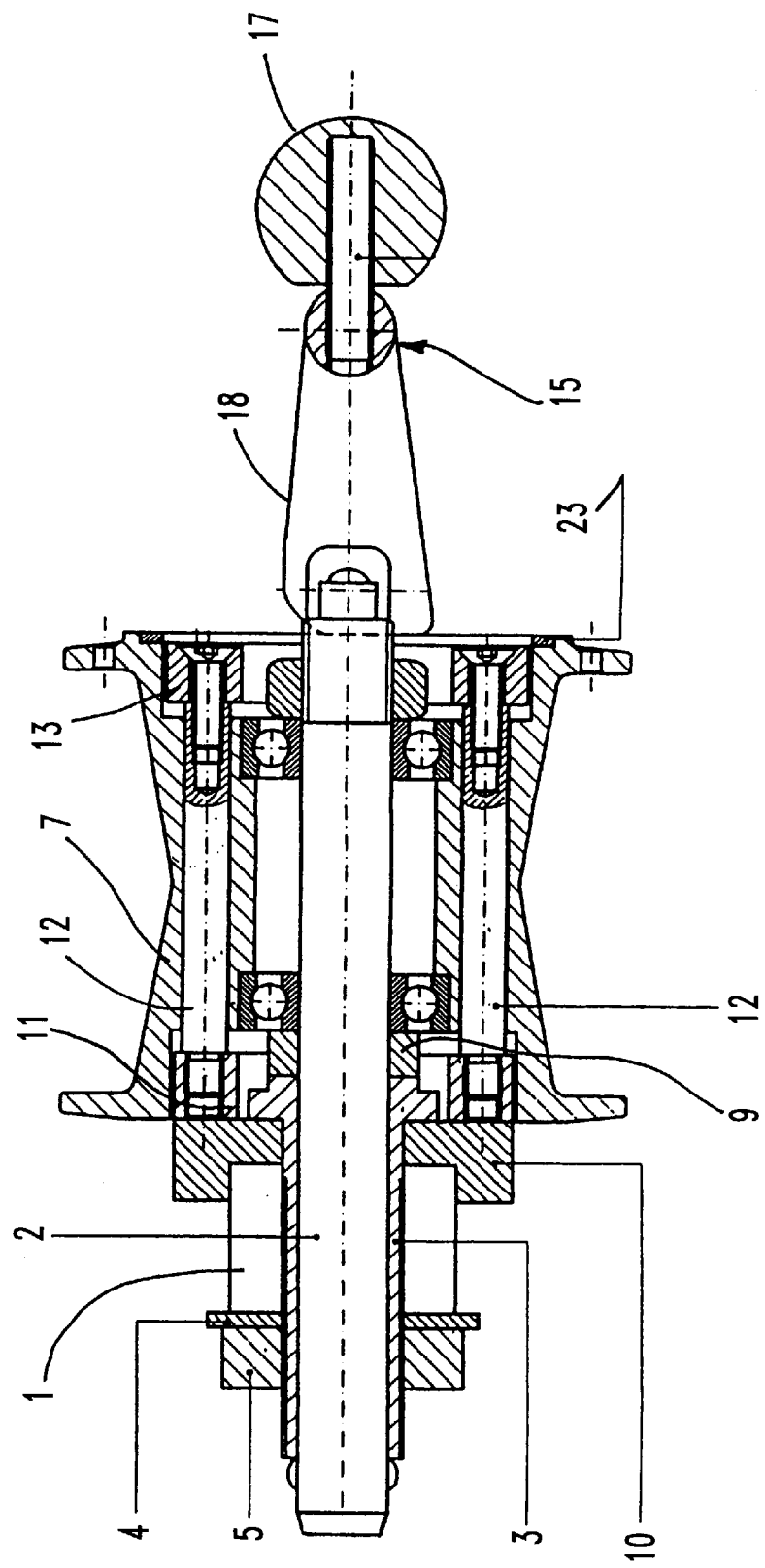
Figure 3:
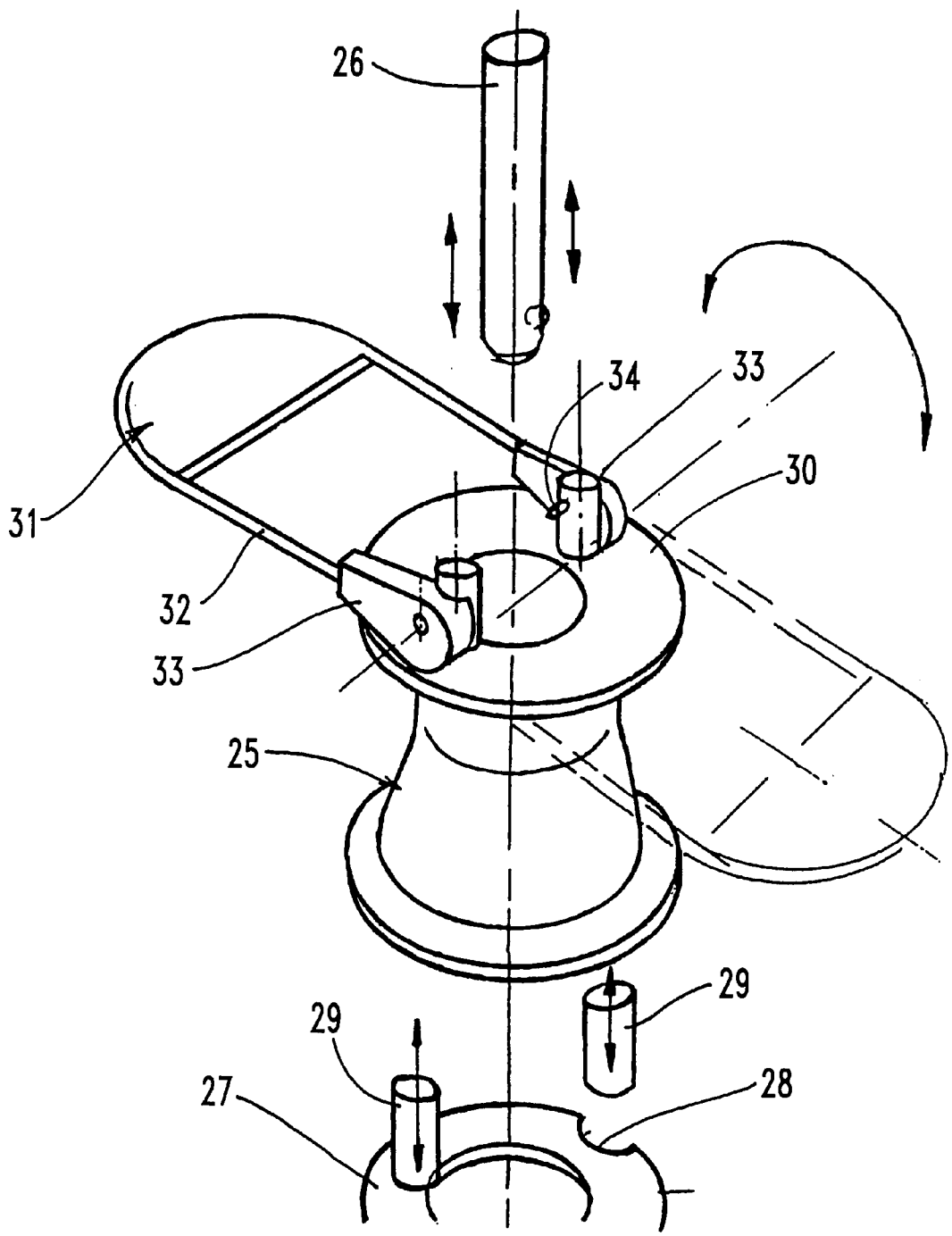

One embodiment is described below by way of an example, with different variants of the subject of the invention, making reference to the attached drawing in which:

FIGS. 1 and 2 are sectional views of the device along the two planes, horizontal and vertical respectively, and FIG. 3 is a perspective sketch illustrating the main components of the device in a variant form of construction.

In FIG. 1, reference number 1 denotes a bar of rectangular section, belonging to the frame of a vehicle such as a wheelchair. A removable journal 2 engages in an adaptor socket 3, immobilised by a washer 4 and a nut 5, in a hole in the bar 1. The journal 2 is of a type enabling fast dismantling from its outer end only. It has two ball bearings 6, the outer rings of which are held in slots in the inside surface of a hub 7 whose two peripheral end flanges 8 have holes to take the spokes of the wheel (not shown).

In fixing the adapter socket 3 to the bar 1 of the frame, the nut 5 also fixes an anti-rotation ring 10 to this bar, this ring being countersunk to engage in the bar 1 (see also FIG. 2). The ring 10 belongs to the fixed part of the blocking mechanism.

The moving part of this mechanism fits entirely into the hub 7. It comprises a rigid reinforcement consisting of an interior ring 11, two link rods 12 (FIG. 2) and an outer ring 13. The two rings 11 and 13 lodge in cylindrical recesses at the ends of the hub 7 and the rods 12 pass through holes parallel to the shaft of the hub, at a distance from this shaft greater than the external diameter of the bearings 6. The recesses in the hub are deep enough to allow the reinforcement 11, 12, 13 the play required for operation of the device.

Finally, the moving part of the mechanism also includes a manual control device. As can be seen in FIG. 1, the ring 13 has two projections 14 positioned diametrically opposite such as to support a control lever 15 formed by a lever shaft 16 with a control handle 17, and two eccentric bars 18 fixed to the ends of the shaft 16. These bars pivot coaxially on the projections 14 by means of spindles 19 driven into one of the parts and engaging into the other by free friction. Also, the contour of the bars 18 at their end of the hub side is such that they act as cams bearing on a narrow ring of hard material 23 fixed to the outside surface of the hub 7. The profile of the cams is eccentric in relation to the pivoting axis defined by the spindles 19. This profile can be seen in FIG. 2.

The mechanism operates by means of springs which, in the embodiment described, are shown in FIG. 1. With this embodiment, they are in the form of two short compression springs 20 engaging in counterbores, at the bottom of the recess in the hub 7 containing the interior ring 11. These springs, arranged either side of the journal 2, press on the ring 11 and, with it, on the entire reinforcement 11, 12, 13 in the direction of the ring 10. The latter has one or more projecting pins 21 driven into holes whilst the ring 11 has a corresponding number of holes 22 adapted to the diameter of the pins 21. In the position shown in FIGS. 1 and 2, the mechanism is blocked. The lever 15 extends in the horizontal plane. The part of the cams 18 with the smallest radius bears on the ring 23 such that the reinforcement 11, 12, 13 is in its extreme left position shown in FIG. 2. Two holes 22 engage on the pins 21, which locks the hub in relation to the fixed ring 10. To release the wheel, the lever 15 simply needs to be lifted upwards by gripping it with the handle 17. Its rotation pulls the reinforcement 11, 12, 13 to the right against the action of the springs 20 such that the ring 11 is released from the pins 21. The top flat part of the cams 18 presses against the ring 23, which ensures that the lever 15 is in a stable position. On the reverse movement of the latter, the ring 11 presses against the heads of the pins 21 until the holes 22 are in a position which enables the reinforcement to move to the left.

In this embodiment, it would also be possible, as a variant, for the geometry of the cams to be such that the blocking movement corresponds to an angular displacement of 180 degrees of the lever 15. However, FIG. 3 shows another variant with an angular displacement of 180 degrees, in which the reinforcement of the moving part is also simpler.

This sketch shows the hub 25 and the journal 26 in the released position. The fixed part of the mechanism is represented by a ring 27 with two notches 28. This ring is fixed to the vehicle frame by a means not shown. The moving reinforcement here is formed by two parallel rods 29 interconnected, for example by a ring, similar to the internal ring 11, likewise lodging in a recess in the hub 25. However, these rods pass through the ring and their ends form the locking elements of the moving part by engaging in the notches 28. As a variant, the ends of the rods can also be embedded in the thickness of the ring and the latter may have a ring or disc with notches on the circumference. The fixed part is then shaped as in the first embodiment, with projecting pins working with the openings or notches in the ring or collar on the moving ring. Similar springs to springs 20 are provided between the hub and this ring.

At the outer end, the rods 29 emerge on the front surface 30 of the hub.

As can be seen in FIG. 3, the control lever 31 has two parallel arms 32 which are flexible and end in eccentric cams 33. These have a vertical groove on their inside surface such that they move laterally on pivoting spindles 34 against the flexibility of the arms 32 when the lever is pivoted from the position represented by continuous lines to the position shown in the sketch on the right in FIG. 3. By appropriate adjustment of the flexibility of the arms of the lever and the active surfaces of the cams 33, operation of the device is ensured and the two end positions of the lever are stable. Locking still occurs if the lever is lowered out of the engaged position. It will also be noted that the 180 degree line of travel reduces the force to be developed in operation, which is important in the case of vehicles for the disabled.

In any case, the removable journal 2 or 26 remains perfectly accessible from the outside of the wheel, enabling fast easy dismantling.

The device as per the invention has the advantage of enabling the wheel to be positioned and removed fast, without first orientating it, despite the blocking mechanism.

What is claimed is:

1. Wheel blocking device in relation to a vehicle frame element, in a wheelchair, comprising a journal with a shaft linked to the frame, a wheel hub pivoting on the journal by means of bearings, a pivoting lever mounted at the end of the hub opposite the frame and controlling a blocking mechanism, said mechanism comprising moving and fixed parts respectively, engaging one another in a blocking position of the lever, wherein the fixed part is rigidly secured to the frame element and is provided with blocking components arranged around said shaft, the moving part is rotatively connected to the hub and comprises blocking elements arranged for cooperating with the said blocking components and link means extending along the shaft, outside the bearings, for joining said lever to said blocking elements in such a manner that the latter engage or disengage the blocking components when the lever is acted.

2. Device as per claim 1, characterised in that said blocking elements of the moving part are situated in a recess in the hub on the frame side, said moving part also comprising two link rods that cross the hub axially at a distance from the shaft greater than the external diameter of the bearings and a means of supporting and pivoting the lever, at the outer ends of the rods.

3. Device as per claim 2, characterised in that the moving part of the mechanism is acted on by one or more springs which hold it in a stable position at least in the blocking position.

4. Device as per claim 3, characterised in that the means of supporting and pivoting the lever comprises two diametrically opposite pivoting spindles, for two arms of the lever, these arms having cams which bear on the circumference of the hub in such a way as to control the axial displacement of the moving part in response to the pivoting of the lever.

5. Device as per claim 3, characterised in that said springs act permanently in the direction of the fixed blocking elements.

6. Device as per claim 4, characterised in that said springs are combined with the lever, the geometry of the link between the cams and the moving part of the mechanism being designed such that the lever pivots 180 degrees between the blocked position and the released position, these two positions being stabilised by the force of the springs or the elasticity due to the shape of the lever.

7. Device as per claim 1, characterised in that the fixed blocking components are formed by one or more pins, this pin or these pins working with holes or notches in the moving part.

8. Device as per claim 1, characterised in that the fixed blocking components are formed by one or more holes or notches made in a ring fixed to an upright of the frame coaxially to the journal, this (or these) hole(s) or notches(s) working with one end of one or more link rods forming part of the moving part of the mechanism.

9. Device as per claim 1, characterised in that the link between the lever and the moving part of the mechanism is arranged such that the lever has two static positions orientated 90 degrees or 180 degrees in relation to each other, one being the locking position and the other the release position.

* * * * *

UNITED STATES PATENT AND TRADEMARK OFFICE
CERTIFICATE OF CORRECTION

PATENT NO.    : 6,237,724 B1
DATED         : May 29, 2001
INVENTOR(S)   : Franklin F. Niedrig It is certified that error appears in the above-identified patent and that said Letters Patent is hereby corrected as shown below:

<u>Title page,</u>
Item [56], References Cited, please change "6/1932 Noelting et al." to -- 10/1930 Noelting et al. --.

Signed and Sealed this

Eleventh Day of June, 2002

Attest:

Attesting Officer

JAMES E. ROGAN
*Director of the United States Patent and Trademark Office*